United States Patent [19]

Bihl

[11] Patent Number: 4,636,188

[45] Date of Patent: Jan. 13, 1987

[54] PROCESS AND APPARATUS FOR MANUFACTURING CARDBOARD TUBES WITH INCORPORATED CLOSURE

[76] Inventor: Jean-Marie Bihl, 67 avenue de la Belle Gabrielle, F-94130 Nogent sur Marne, France

[21] Appl. No.: 751,642

[22] Filed: Jul. 3, 1985

[30] Foreign Application Priority Data

Jul. 6, 1984 [FR] France ............................ 84 10778

[51] Int. Cl.[4] ............................................ F16H 7/06

[52] U.S. Cl. ................................ 493/157; 493/289; 493/308; 493/370; 82/55; 82/89; 82/93

[58] Field of Search ............... 493/150, 287, 288, 289, 493/290, 369, 370, 354, 308, 157; 82/85, 89, 92, 93, 94, 97, 60, 40, 101, 46, 47, 55, 71, 86, 88

[56] References Cited

U.S. PATENT DOCUMENTS 2,530,319 11/1950 Young ................................ 83/333

3,302,500 2/1967 Hackenberger et al. ............... 82/97

3,479,931 11/1969 Bishop ................................ 493/354

*Primary Examiner*—Francis S. Husar

*Assistant Examiner*—Robert Showalter

*Attorney, Agent, or Firm*—William A. Drucker

[57] ABSTRACT

A process and apparatus are provided for manufacturing cardboard tubes with incorporated closure for packing or sending articles or documents and tubes obtained by implementing this process. The process comprises the continuous formation of a cardboard tube on the rotary mandrel of a spiralling machine and cutting the tube into tube elements discharged by the machine. This cut out is provided in the form of a sinusoid with provision of appropriate fold lines. Thus tube elements are obtained, without waste of material, whose ends have two opposite tongues which may be folded back, the adjacent ends of two successive tube elements being offset by 90°.

4 Claims, 5 Drawing Figures

PROCESS AND APPARATUS FOR MANUFACTURING CARDBOARD TUBES WITH INCORPORATED CLOSURE

BACKGROUND OF THE INVENTION

1. Field of the Invention

The invention relates to a process for manufacturing rigid cylindrical cardboard tubes of a certain thickness, whose ends are formed so as to provide ready and efficient closure of the tube, an apparatus for implementing this process and the tubes thus obtained.

2. Description of the Prior Art

It is known from Belgian Pat. No. 435 579 to form paper or flexible cardboard cornets, for example cornets for sweets, whose closure is provided by two facing tongues which are folded back one over the other above the opening of the cornet about a folding line curved towards the point of the cornet. Such cornets are made from a sheet of paper or thin easily deformable cardboard which is cut out when flat and is then shaped so as to form a cornet and is fixed by sticking in this position.

It should be understood that the process of Belgian Pat. No. 435 579 cannot be applied to the formation of a cylindrical rigid cardboard tube of a certain thickness, of the kind of tube for example used for sending documents in roll form by post, for it would not be possible starting with rigid cardboard sheets of a certain thickness, cut out when flat, to deform them so as to obtain cylindrical tubes without considerable risk of breaking the cardboard and without creating an unacceptable bulge in the sticking zone.

The purpose of the present invention is to overcome these drawbacks and for this it provides a process for forming cylindrical tubes from rigid cardboard, comprising opposite tongues cut out so as to form an hermetic closure system, as well as an apparatus for implementing this process.

SUMMARY OF THE INVENTION

For this, the process of the invention consists in forming continuously and in a conventional way spiralled cylindrical cardboard tubes and in providing on each tube thus formed, during manufacture, a cut out at each end thereof so as to form opposite tongues for closing. In particular, in accordance with the process of the invention, the cut out at the rear end of a tube during formation forms at the same time, with an offset of 90° with respect to the longitudinal axis of the tube, the cut out at the front end of the next tube being formed, thus avoiding a waste of material.

For implementing this process, the present invention proposes associating, with a machine for the continuous manufacture of spiralled cardboard tubes called "spiraller" on which the cardboard tube is formed and which has,in relief on its periphery, cutting means forming a sinusoid which corresponds to the development of the cut end of the tube. On each side of this sinusoid, the outer peripheral surface of the cylinder comprises discontinuous cutting means in the form of teeth, disposed in the arc of a circle connecting together two successive bulges of the sinusoid and intended to form bending lines for the end tongues of the tube.

The arcuate lines of discontinuous cutting means are therefore offset by $\pi/2$ on one side of the sinusoid with respect to the other, which corresponds to the existing offset of $\pi/2$ between the cut outs at the adjacent ends of two successive tubes.

Advantageously, with two successive alternating bulges of the sinusoid are associated arcuate cutting elements whose curvature is in the reverse direction to the associated bulge defining therewith a lune shape, these arcuate cutting parts being intended, during the action of the cutting means on the tube being formed, to form on one of the two tongues of each tube end, which will be the tongue to be bent back first during closure of the tube, a notch allowing a finger to be introduced therein for easily raising this tongue during opening of the tube.

Advantageously, the development of the cylindrical cutting member of the invention will be twice that of the cardboard tube to be formed, thus providing an excellent action for cutting the cardboard.

It will be understood that, during the manufacture of cardboard tubes on a spiralling machine equipped with cutting means in accordance with the invention, the machine winds cardboard layers in spirals on a rotary mandrel, after which it controls engagement of the rotary mandrel by the cutting cylinder which, mounted freely rotating on its shaft, is rotated by the pressure against this mandrel while moving longitudinally therewith, thus cutting the cardboard cylinder carried by this mandrel and forming at one and the same time, and without loss of material, the rear end with opposite closure tongues of a finished tube which is discharged from the machine and the front end with opposite closure tongues of the next tube being formed.

BRIEF DESCRIPTION OF THE DRAWINGS

For a better understanding of the invention, a preferred embodiment of the particular tooling required for implementing the process of the invention and the tube obtained according to this process will be described hereafter, by way of non limitative example, with reference to the accompanying schematical drawings in which.

DESCRIPTION OF THE PREFERRED EMBODIMENT

Figure 1:
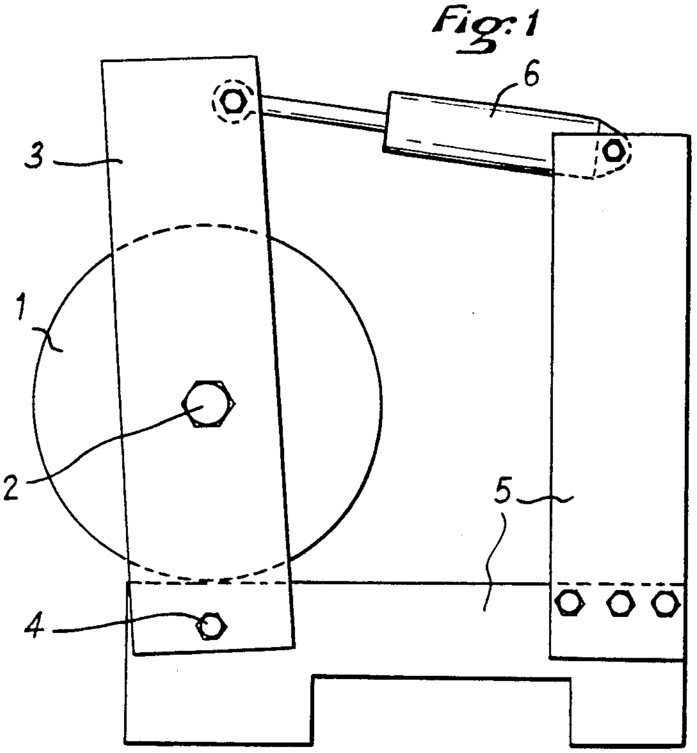
FIG. 1 is an end view of the cutting means of the invention, for association with a "spiraller" equipped with mobile knives.

In FIG. 1 there has been shown schematically the cutting device intended to be associated with a known spiralling machine. This cutting device is formed by a cylinder 1 mounted freely rotating on a shaft 2 itself supported by arms 3 each adapted for pivoting laterally about a lower pivoting axis 4, with respect to support 5. Each arm 3 is connected to support 5 by means of a pneumatic cylinder 6 and shaft 2 of cylinder 1 is intended to be disposed parallel to the longitudinal axis of the rotary mandrel (not shown) of the spiralling machine on which the cardboard tube is formed.

Figure 2:
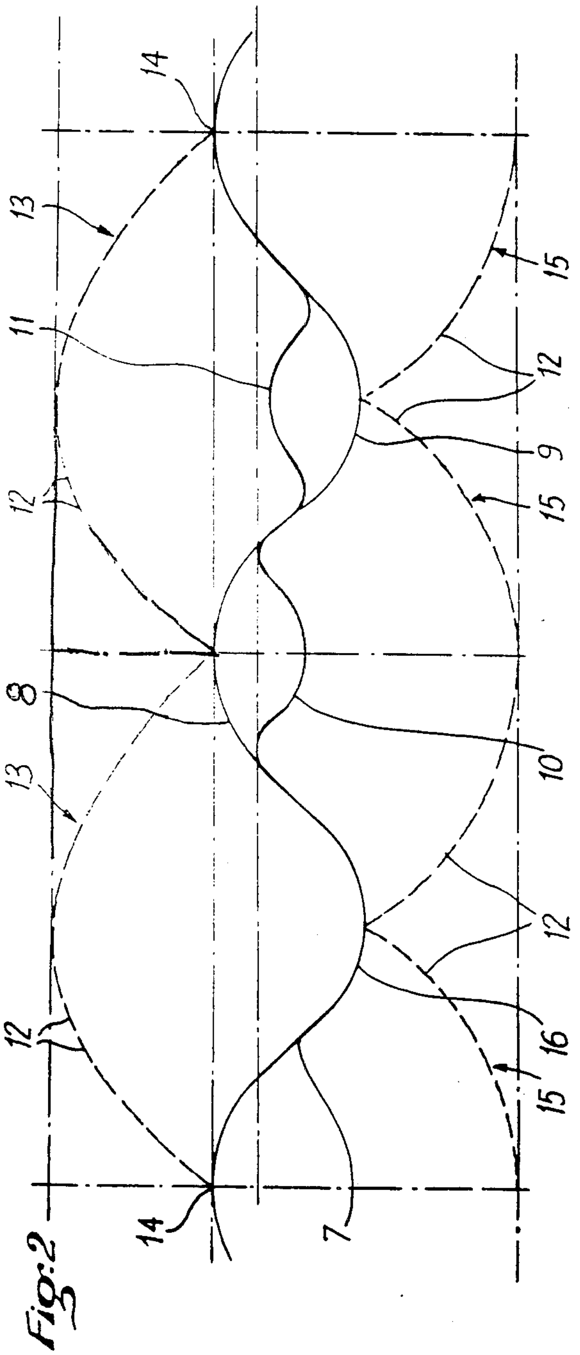
FIG. 2 shows, on a larger scale, a flat development of the cutting means of the invention.

On the outer surface of the cylinder are machined cutting reliefs whose flat development is shown in FIG. 2. These reliefs comprise centrally a continuous sinusoid 7 whose opposite bulges are spaced apart by $\pi/2$. Two opposite successive bulges 8, 9 of the sinusoid 7 are each associated with an opposite arcuate part, respectively 10, 11 whose role will be explained further on and which determines a lune shape with the bulge with which it is associated.

On each side of the sinusoids 7 are disposed discontinuous cutting elements 12 in the form of teeth spaced apart along arcs of a circle joining together the successive bulges of the sinusoid 7. These teeth serve for forming the folding lines of the foldable tongues on the cardboard tube being formed. As can be seen in FIG. 2, the arcuate lines 13 of teeth 12 disposed above the sinusoid 7 join the successive bulges 8 and 14 whereas the arcuate lines 15 of teeth 12, disposed below the sinusoid 7, join the successive bulges 16 and 19 which are out of phase by $\pi/2$ with respect to bulges 8 and 14.

The development of cylinder 1 may have the same dimension as that of the tube to be formed, but experience has shown that development of twice the dimension of that of the tube to be produced gives particularly advantageous results.

In the process of the invention, at given moments during manufacture of the cardboard tube on the mandrel of the spiralling machine, the pneumatic cylinders 6 are automatically actuated so as to engage the cardboard tube by the cutting cylinder 1 which is driven in rotation by rotation of the tube on the mandrel, then cylinder 1 is retracted. This action ensures cutting of the cardboard tube by forming at one and the same time, and without waste of material, the rear end of one tube and the front end, out of phase by $\pi/2$, of the next tube.

Figure 3:
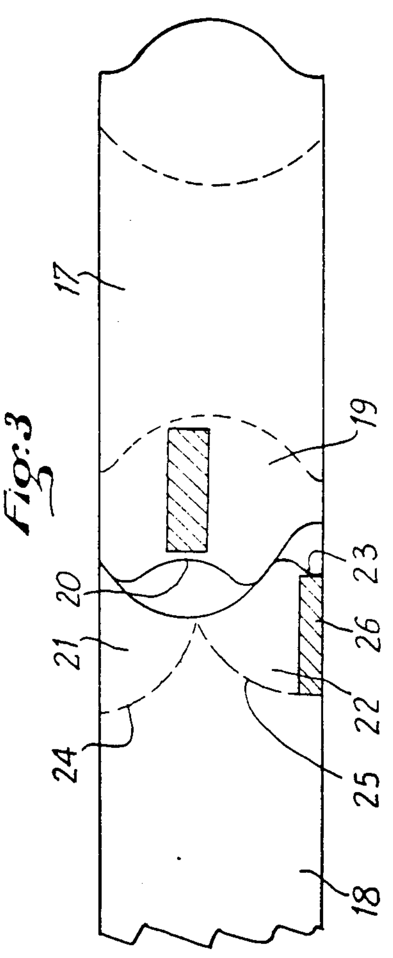
FIG. 3 is a top view of a tube in accordance with the invention, during manufacture, showing the complementarity of the shape of its rear end with the front end of the next tube during the manufacturing process.

That can be particularly well seen in FIG. 3 where a cardboard tube has been shown during formation on the mandrel of the spiralling machine, just after being subjected to the action of the cutting cylinder 1. The tube is seen at the moment when, because of the action of the cutting tool, it will separate into a front part, forming a finished tube 17 which will be discharged, and a rear part 18 which will form the next tube. The rear end of tube 17 has two opposite tongues of which only tongue 19 is visible in the Figure which has been cut out by the bulge 8 of the cutting sinusoid 7 of cylinder 1, with provision of a notch 20 provided by action of the arcuate cutting part 10 of cylinder 1. The fold line of tongue 19 has been formed by the action of the arcuate line 15 of teeth 12 of cylinder 1. For the tube element 18, there has been shown at 21 one of the closure tongues at the front end, which was cut out by the bulge 16 of the sinusoid 7 of cylinder 1 and at 22 the opposite tongue cut out by the bulge 9 of sinusoid 7. On tongue 22 is formed the notch 23 determined by the arcuate cutting part 11. The fold lines 24 and 25 of tongues 21 and 22 are formed under the action of arcuate lines 13 of teeth 12 carried by cylinder 1.

It can be seen that, because of the complementarity of the adjacent ends of tubes 17 and 18, offset by $\pi/2$ with respect to the common axis of the tubes, there is practically no wasted material, since the only wasted material corresponds to notches 20 and 23.

Figure 4:
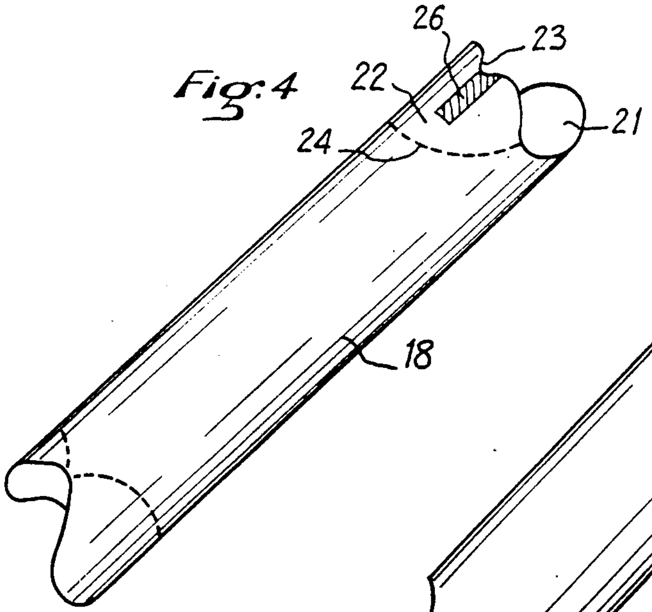
FIG. 4 is a perspective view of a tube obtained in accordance with the invention, shown in the open position.
Figure 5:
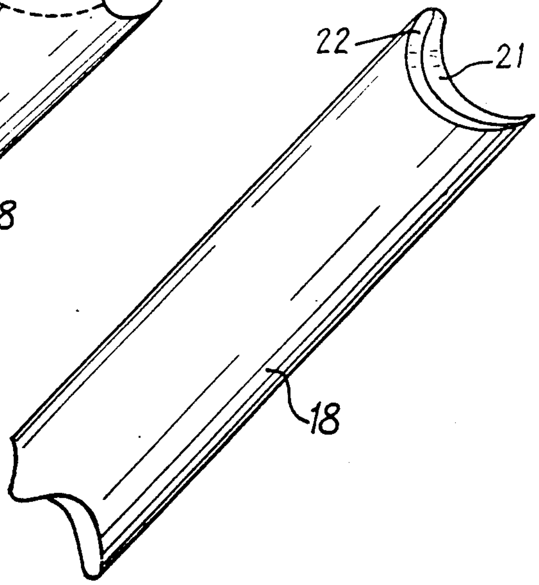
FIG. 5 is a view corresponding to FIG. 4 of the tube closed at both ends.

As can be seen in FIGS. 4 and 5, the closure of the tube, for use thereof, is particularly easy and efficient since it is sufficient first of all to fold back tongue 22 (which comprises notch 23) through about 90° about the fold line 25 which already practically closes off the end of the tube. Then tongue 21 is folded back over tongue 22, about the fold line 24. Advantageously, on the outer face of tongue 22 is disposed a double face adhesive element 26 which, when tongue 21 is folded back over tongue 22, allows a very strong closure to be obtained, particularly appropriate for sending tubes by post, without modifying the presentation and external aesthetic appearance of the closed package.

It will be understood that the above description has been given solely by way of example, without any limitative character, and that constructional additions or modifications could be made thereto without departing from the scope and spirit of the invention defined by the following claims.

In particular, the tube obtained in accordance with the process of the invention could be made from a mixed cardboard-aluminium material or from a cardboard-plastic material.

What I claim is:

1. In a process for manufacturing rigid cylindrical carboard tube elements with incorporated closure system, the steps comprising:
   (a) continuously forming a cardboard tube on the rotary mandrel of a spiralling machine,
   (b) engaging the rotating formed tube with a laterally disposed rotating cutting member,
   (c) performing a longitudinal displacement of the mutually engaged rotating tube and rotating cutting member,
   (d) cutting said cardboard tube along a sinusoid edge in such a manner that the adjacent ends of two successive tube elements are out of phase by $\pi/2$ and
   (e) simultaneously providing said ends of the tube elements with fold lines.

2. Apparatus for cutting into elements, each provided with a closure system, a rigid cylindrical cardboard tube continuously formed on a spiralling machine having a rotary mandrel, which comprises:
   (a) a support for a cutting member, laterally disposed with relation to the rotary mandrel of the spiralling machine on which the tube is formed;
   (b) arms pivoted to said support;
   (c) a shaft disposed parallel to said mandrel and mounted on said arms pivoted to said support;
   (d) control means disposed between said support and said arms for pivoting said arms towards said mandrel; and
   (e) a cylindrical cutting member mounted for free rotation on said shaft, said cutting member presenting on its outer surface a continuous cutting relief having in flat development the shape of a sinusoid, comprising, on each side thereof, two bulges of the same height, arcuate lines of teeth being provided on said outer surface of the cutting member and connecting two successive bulges of said sinusoid disposed on a same side thereof.

3. Apparatus according to claim 2 wherein the development of the outer surface of the cylindrical cutting member has a dimension twice that of the tube to be formed.

4. Apparatus according to claim 2 wherein said continuous cutting relief presents, in front of two successive opposite bulges of the sinusoid, an arcuate cutting portion oriented in opposite direction.

* * * * *